(No Model.)
J. W. HYATT & C. S. LOCKWOOD.
PROCESS OF AND APPARATUS FOR MOLDING PLASTIC MATERIAL.
No. 259,984. Patented June 20, 1882.
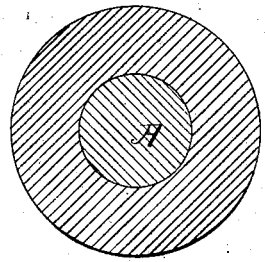
Fig. 1.
Fig. 2.
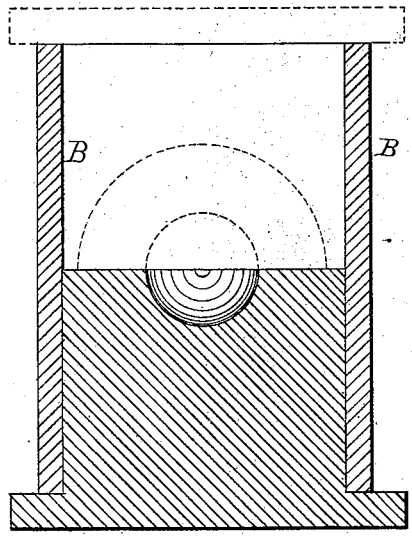
Fig. 3.
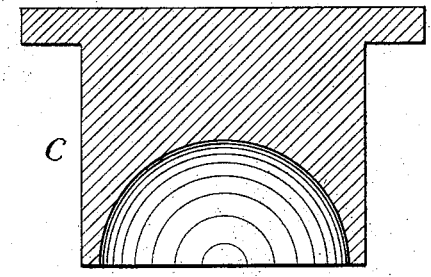
Fig. 4.
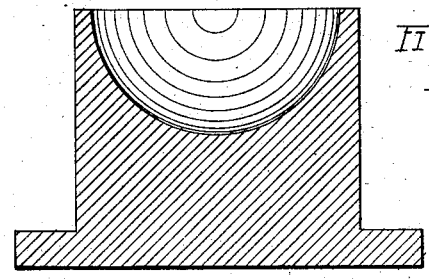
Witnesses:
Chas. E. Gill
Herman Gustow
Inventors:
John W. Hyatt
and
Charles S. Lockwood
By their Atty
Rowland Cox
N. PETERS, Photo-Lithographer, Washington, D. C.

UNITED STATES PATENT OFFICE.

JOHN W. HYATT, OF NEWARK, NEW JERSEY, AND CHARLES S. LOCKWOOD, OF ALBANY, NEW YORK, ASSIGNORS TO THE BONSILATE COMPANY, (LIMITED,) OF ALBANY, NEW YORK.

PROCESS OF AND APPARATUS FOR MOLDING PLASTIC MATERIAL.

SPECIFICATION forming part of Letters Patent No. 259,984, dated June 20, 1882.

Application filed May 11, 1882. (No model.)

*To all whom it may concern:*

Be it known that we, JOHN W. HYATT, of Newark, in the county of Essex and State of New Jersey, and CHARLES S. LOCKWOOD, of Albany, county of Albany, and State of New York, have invented a new and useful Improvement in Processes and Apparatus for Molding Plastic Material, of which the following is a specification, reference being had to the accompanying drawings.

The invention has relation to an improved process and apparatus to be used in the application of an exterior section or coating to articles having a core or interior portion made of material different from the exterior part.

The object of the invention is to provide a means of applying an exterior section or coating of expensive material to a core or interior part of inexpensive material, whereby an article is produced having substantially the same characteristics as one made entirely of the more desirable material.

We contemplate the employment of our improved process and apparatus particularly in the production of billiard-balls, in the manufacture of which it will be found to be of especial value.

In the accompanying drawings, Figure 1 is a central section of a billiard-ball made according to our invention. Fig. 2 is a central vertical section of the shell and core-set hereinafter described, the upper plunger being shown in dotted lines. Figs. 3 and 4 are central vertical sections of the upper and lower plungers.

In the drawings an apparatus adapted to the manufacture of billiard-balls is shown, the description of which will explain the exact nature and objects of the invention and illustrate how it may be used in the production of other articles.

The core A is formed in any convenient way, having been given a definite shape substantially similar to that of the article which it is intended to produce. The core is placed in the "core-set," as illustrated in Fig. 2, the core-set being of any convenient form, as occasion may require.

B is a wall or shell adapted to fit over the core-set, the nature and construction of which is sufficiently illustrated in Fig. 2. The shell will be of a character adapted to the effectuation of the objects for which it is employed, as will be understood by persons skilled in the art to which the invention relates. The wall or shell B having been placed in position, as shown in Fig. 2, a sufficient quantity of material to form one half of the exterior section of the article is introduced, when the plunger C is operated to compress and give form to the material out of which the outer section is made, as illustrated in Fig. 2. The mold or shell is then reversed and the core-set removed, when the quantity of material out of which the exterior section is intended to be formed is introduced upon the side of the core that has not been covered, whereupon the second plunger is operated and the core and its exterior section subjected to a compression sufficient to unite the different elements, after which the plungers are retracted and the ball completed by means of molds or dies, or in the apparatus patented to one of us April 5, 1881, said patent being numbered 239,791, or otherwise, as may be preferred.

We have found this process and apparatus especially useful in the manufacture of billiard-balls; but it may be employed for other purposes, in which event the process and apparatus will differ only in matters of detail, which need not be specifically explained.

What we claim as our invention, and desire to secure by Letters Patent, is—

1. The process herein described of forming articles of different materials or compounds, which consists in first introducing the core in a core-set and applying a shell or wall to confine the material out of which the outer section is to be made; second, introducing a proper quantity of material to form half of the exterior section and compressing it upon the core; third, removing the core-set and introducing a suitable quantity of material to cover the side of the core which has not been coated; fourth, effecting a compression of the material last introduced by means of a second plunger; fifth, finishing the article.

2. The apparatus for molding hereinbefore described, consisting of the core-set, shell or wall, and plungers, the whole operating substantially as described.

In testimony that we claim the foregoing improvement in processes and apparatus for molding plastic materials, as above described, we have hereunto set our hands this 10th day of March, 1882.

JOHN W. HYATT.
CHARLES S. LOCKWOOD.

Witnesses to signature of C. S. Lockwood:
ALBERT HESSBERG,
DAVID M. KINNEAR.

Witnesses to signature of John W. Hyatt:
CHAS. C. GILL,
ROWLAND COX.